United States Patent Office 3,295,392
Patented Jan. 3, 1967

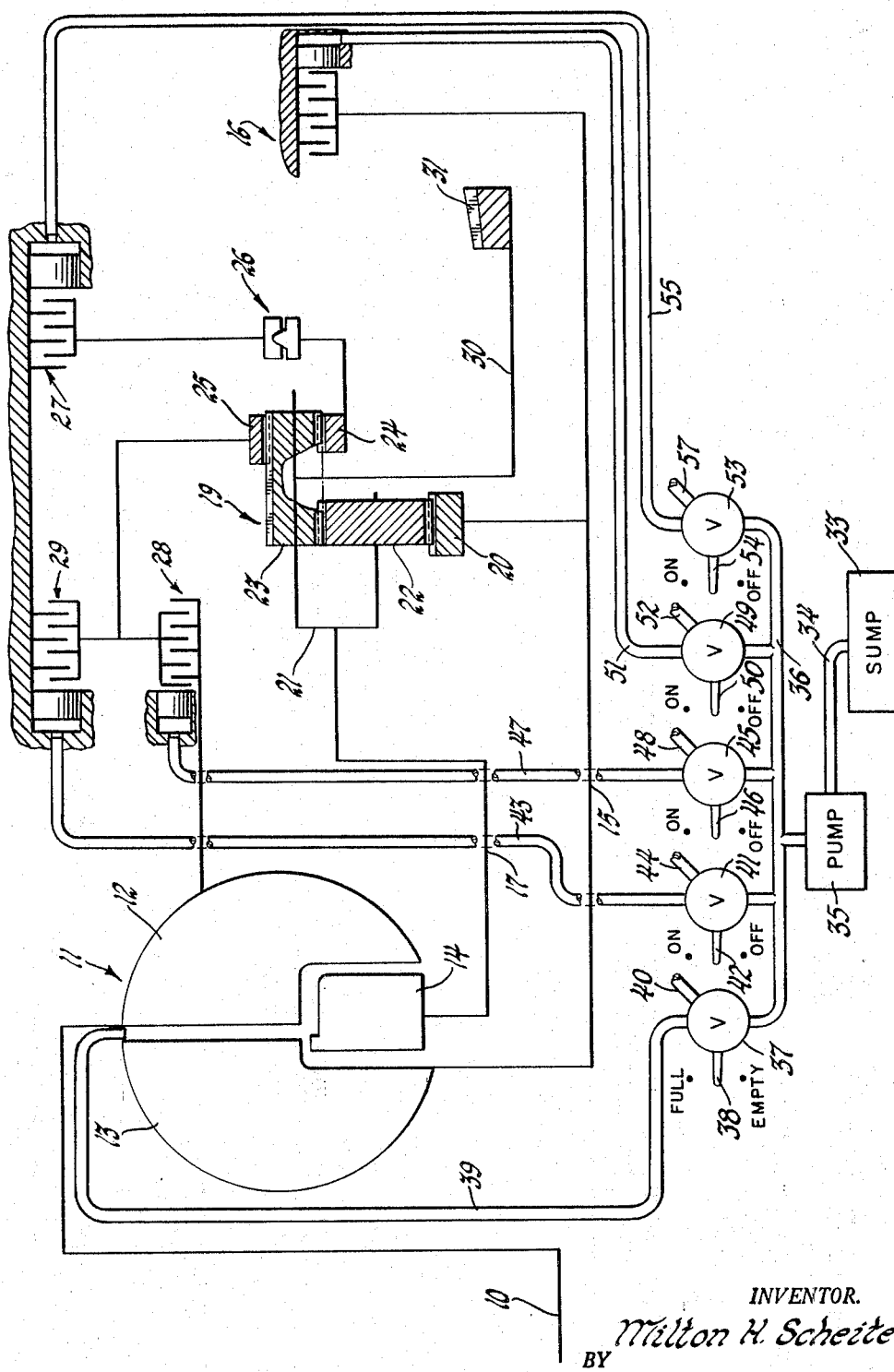

3,295,392
TRANSMISSION
Milton H. Scheiter, Birmingham, Mich., assignor to General Motors Corporation, Detroit, Mich., a corporation of Delaware
Filed Nov. 13, 1963, Ser. No. 323,350
6 Claims. (Cl. 74—677)

This invention relates to transmissions and more particularly to planetary transmissions commonly referred to as automatic transmissions for use in vehicles.

The transmission described herein comprises a very compact design incorporating compound planetary gearing having a single planet carrier and capable of providing neutral, four forward drive ratios including first, second, direct drive and overdrive and reverse. In addition, the transmission incorporates a hydrodynamic torque converter incorporating an engine driven impeller, a first turbine connected to drive, a power input sun gear, and a second turbine which at times functions as a reaction member and at other times functions as a second turbine. This turbine or reaction member is connected to rotate with the final power delivery shaft through the single planet carrier of the gear unit.

An object of this invention is to provide a compact, simple transmission capable of providing four forward drive ratios, neutral and reverse drive.

Another object of this invention is to provide a transmission having a torque converter and planetary gearing wherein drive in first, direct and reverse is provided through the converter and gearing unit and wherein drive in second and fourth is accomplished solely through the gearing unit and exclusive of the converter.

An additional object of this invention is to provide a simple compact transmission capable of providing four forward drive ratios, neutral and reverse wherein the forward drive ratios include low gear, second gear, direct drive and overdrive.

A further object of this invention is to provide a simple transmission of the type described having a single planet carrier supporting intermeshing planet gears and providing a connection connecting a torque converter reaction member directly to a final power delivery shaft.

A more particular object of this invention is to provide a transmission of the type described and having a sun gear directly connected to a torque converter turbine and driven by said turbine in first, direct and reverse drive and braked against rotation to establish overdrive drive ratio.

A further object of this invention is to provide a transmission of the type described having a ring gear clutched directly to a torque converter impeller in second gear and overdrive drive ratio and braked against rotation in reverse.

These and other objects and advantages of this invention will be apparent from the following description in which the sole figure is a schematic diagram of a transmission constructed in accordance with the principles of this invention.

As shown in the drawing, an engine driven power input shaft 10 is connected to drive an impeller 12 of a hydrodynamic torque converter unit generally indicated at 11. A first turbine 13 is connected to a first sun gear 20 of a planetary gearing unit indicated generally at 19 and to an engageable and releasable overdrive disc brake indicated generally at 16 by a shaft 15. A reaction member 14 is connected to a planet carrier 21 for rotation therewith by means of a sleeve shaft 17. The shaft 15 extends through sleeve shaft 17. Planet carrier 21 is connected for rotation with a final power delivery shaft 30 and connects torque converter reaction member 14 to final power delivery shaft 30 for rotation therewith as a unit. Shaft 15 also extends through final power delivery shaft 30. Carrier 21 also supports a short planet pinion gear 22 in mesh with sun gear 20 and in mesh with a long planet pinion gear 23. Carrier 21 further supports long planet pinion 23 in mesh with a sun gear 24 and a ring gear 25.

Torque converter unit 11 is of the type adapted to be selectively filled with and emptied or working fluid and is selectively filled with and emptied of such fluid to control the transmission drive ratio in conjunction with the application of various brakes and clutches. Dump and fill converters per se are well known in the art and accordingly further description of this feature is believed not necessary. Sun gear 24, which functions as a reaction member in certain drive ratios is connected to a so-called forward drive brake 27 through a one-way brake 26. Ring gear 25 is connected to a second gear clutch 28 and to a reverse brake 29. A pinion gear 31 is driven by final power delivery shaft 30 for final power delivery from the transmission.

In operation, four forward drive ratios including first, second, third or direct drive, and overdrive, neutral and reverse drive may be obtained.

For neutral or no drive all of the brakes and clutches are released and the torque converter unit 11 is filled with fluid. Turbine 13 will drive sun gear 20 in a forward direction, causing short planet pinion 22 to rotate in a reverse direction and long planet pinion 23 to rotate in a forward direction about its axis of rotation in carrier 21. Since there is no reaction member in the gearing, the planet pinions will spin freely about their axes of rotation and will not drive carrier 21. Reaction member 14 will tend to rotate rearwardly but is held against rotation by the load of the vehicle upon shaft 30. In neutral there is no effective torque multiplication delivered from the hydrodynamic torque converter to final power delivery shaft 30 through the planetary gearing. Reaction member 14 will tend to rotate in a reverse direction but will not normally be capable of applying sufficient reverse torque to carrier 21 to drive final power delivery shaft 30.

First or low gear forward drive is obtained by engaging brake 27 to render one-way brake 26 effective to prevent reverse rotation of sun gear 24. At engine idle, turbine 13 will be unable to drive sun gear 20 with sufficient torque to cause the gearing to drive the planet carrier forward against the load of the vehicle applied to the carrier. As the engine is speeded up, turbine 13 will drive sun gear 20 forwardly at the maximum torque multiplication of the converter 11. Reactor 14 will tend to rotate rearwardly but will be rotated forwardly at output shaft speed since it is connected directly to output shaft 30 by carrier 21. Reactor 14 will, at this stage, function as a forwardly rotating reactor member to provide hydrodynamic torque multiplication in the converter. With sun gear 24 held against reverse rotation and serving as a reaction member for the planetary gearing unit, planet gears 22 and 23 will drive planet carrier 21 and shaft 30 forwardly at the torque multiplication of converter 11 and gear unit 19. This is low gear forward drive. As the speed of rotation of shaft 30, reactor 14 and turbine 13 increases, the torque multiplication of converter 11 decreases and the speed of rotation of turbine 13 approaches that of impeller 12. This is of advantage in that maximum torque multiplication occurs for standing start and engine overspeed is prevented as the vehicle accelerates. The torque multiplication of gear unit 19 remains constant irrespective of the speed of rotation of output shaft 30, while the torque multiplication of the converter rapidly falls off with increase in speed of rotation of shaft 30.

For second gear forward drive, brake 27 remain engaged, torque converter 11 is emptied of working fluid, and second speed clutch 28 is engaged to connect ring gear 25 to input shaft 10. In second gear, the drive is entirely mechanical at the gear reduction of gear unit 19. The torque multiplication is that afforded by gears 25, 23 and 24 with sun gear 24 serving as the reaction member.

Direct drive is obtained by filling torque converter 11, and maintaining brake 27 and clutch 28 engaged. In direct drive, ring gear 25, sun gear 20 and planet carrier 21 will all rotate substantially at engine speed. Reactor 14 no longer functions as a torque converter reaction member to redirect working fluid to impeller 12 to drive the impeller. In direct drive, due to the speed of rotation of member 14, fluid in the converter strikes the rear side of the reactor vanes to impart forward drive torque to the reactor 14. Member 14 therefore functions as a second turbine during direct drive operation.

Fourth gear or overdrive operation is established by emptying the torque converter of fluid, engaging overdrive brake 16 to prevent rotation of sun gear 20, releasing brake 27 and engaging clutch 28. Drive in overdrive is entirely mechanical with power input ring gear 25 driven at engine speed and sun gear 20 serving as the reaction member for the gearing. Carrier 21 and output shaft 30 are driven at overspeed with respect to input shaft 10 as determined by the drive ratio of the gearing including ring gear 25, planet pinions 23 and 22 and reaction sun gear 20.

Reverse drive is obtained by filling converter 11 with working fluid, releasing brake 27 and clutch 28, and engaging reverse brake 29 to hold ring gear 25 against rotation. With power input to sun gear 20 and with ring gear 25 held against rotation, planet carrier 21 walks around ring gear 25 in reverse at the gear reduction afforded by gears 20, 22, 23 and 25. An additional reverse thrust component is applied to carrier 21 by reaction member 14 which acts a a rearwardly rotating reaction member rotating in reverse at the speed permitted by the planetary gearing. In reverse, member 14 functions both as a rearwardly rotating reaction member to redirect working fluid to impeller 12 to assist in driving the impeller and a turbine to impart reverse torque to carrier 21.

Thus, in reverse, relatively high torque multiplication is afforded by converter unit 11 for driving sun gear 20, by member 14 tending to drive carrier 21 in reverse, and by the gearing itself.

There has been provided herein a transmission of very compact structure having a single planet carrier, a single ring gear, two planet pinions and two sun gears and wherein the torque converter reaction member and single planet carrier are fixed for rotation with the power delivery shaft. The torque converter is filled for first, third or direct drive operation and reverse. Direct mechanical drive is provided through the gearing in second and fourth or overdrive forward operation. Sun gear 20 is driven by turbine 13 in first, third and reverse drive and constitutes a reaction member for fourth or overdrive operation. Ring gear 25 is driven at engine speed in direct forward drive and braked against rotation in reverse drive. Sun gear 24 functions as a reaction member for first and second gear drive and freely rotates in direct drive, overdrive and reverse drive. One-way brake 26 permits sun gear 24 to free-wheel in direct and overdrive operation and brake 27 is released during reverse operation.

A schematic diagram of a hydraulic control system which may be used to control the transmission is also shown in FIGURE 1. An engine driven pump 35 may draw fluid from a transmission sump 33 through a pump suction passage 34 and deliver fluid under pressure to a plurality of control valves through a pump pressure delivery passage 36.

A torque converter control valve 37 may be actuated by a handle 38 to admit fluid under pressure from pressure supply passage 36 to a converter supply passage 39 to fill the converter with fluid or to block off passage 36 from passage 39 and connect passage 39 to exhaust through an exhaust passage 40.

A reverse brake control valve 41 may be actuated by a handle 42 to admit fluid under pressure from passage 36 to a reverse brake servo supply passage 43 to engage reverse brake 29 or to block off passage 36 and to connect passage 43 to exhaust through an exhaust passage 44 to release brake 29.

A second speed clutch control valve 45 may be actuated by a handle 46 to deliver fluid under pressure from passage 36 to a second speed clutch servo supply passage 47 to engage clutch 28 or to block off passage 36 from passage 47 and connect passage 47 to exhaust through an exhaust passage 48 to release clutch 28.

An overdrive brake control valve 49 may be actuated by a handle 50 to connect passage 36 to an overdrive brake supply passage 51 to apply overdrive brake 16 or to position valve 49 to block off passage 51 from passage 36 and connect passage 51 to exhaust through an exhaust passage 52 to release overdrive brake 16.

A forward brake control valve 53 may be actuated by a handle 54 to connect pressure supply passage 36 to a forward brake servo supply passage 55 to engage forward brake 27 or to block off passage 55 from passage 36 and connect passage 55 to an exhaust passage 57 to release forward brake 27.

It will be apparent that the fluid exhausted through the various exhaust passages will be returned to sump 33 and that the valves may be positioned to obtain the various conditions of transmission operation heretofore described.

What is claimed is:

1. A transmission adapted to provide a plurality of forward drive ratios, neutral and reverse, comprising an engine driven power input shaft, a final power delivery shaft, a hydrodynamic torque converter unit of the type adapted to be selectively filled with and emptied of working fluid and having an impeller driven by said input shaft, a turbine and a reaction member, a planetary gearing unit comprising a planet carrier supporting a short planet pinion gear and a long planet pinion gear in mesh with said short planet pinion gear, a first sun gear driven by said turbine and in mesh with said short pinion gear, a reaction sun gear in mesh with said long planet pinion gear, a ring gear in mesh with said long planet pinion gear, means connecting said reaction member of said hydrodynamic unit to said final power delivery shaft for rotation therewith as a unit including said planet carrier, a first brake effective when engaged to prevent rotation of said reaction sun gear in at least one direction, a clutch effective when engaged to connect said ring gear to said input shaft for rotation therewith, and a second brake effective when engaged to prevent rotation of said ring gear, said hydrodynamic torque converter unit being filled with fluid during neutral, forward first gear, forward direct drive and reverse conditions of operation and emptied of fluid in second gear forward drive, said first brake being engaged to complete the establishment of first gear forward drive, said first brake and said clutch being engaged to establish second gear forward drive, said clutch being engaged to establish direct driven when said converter is filled with fluid, said second brake being engaged to establish reverse drive when said turbine is filled with fluid and all of said brakes and clutches being released to establish neutral condition of operation, a fluid pressure source adapted to be connected to said converter, means including a valve operable to admit fluid from said source to said converter or to connect said converter to exhaust, and means for controlling the engagement and release of said clutch and said brakes for controlling the transmission drive ratio.

2. A transmission adapted to provide four forward drive ratios, neutral and reverse, comprising an engine driven power input shaft, a final power delivery shaft, a hydrodynamic torque converter of the type adapted to be selectively filled with an emptied of working fluid and having an impeller driven by said input shaft, a turbine and a reaction member, a planetary gearing unit including a planet carrier fixed for rotation with said power delivery shaft and supporting a short planet pinion gear in mesh with a long planet pinion gear, means connecting said torque converter reaction member to said planet carrier for rotation therewith as a unit, a first sun gear driven by said turbine in mesh with said short planet pinion gear, a reaction sun gear and a ring gear in mesh with said long planet pinion, first engageable and releasable brake means effective when engaged to prevent rotation of said reaction sun gear in at least one direction, and engageable and releasable clutch effective when engaged to clutch said ring gear to said input shaft, second brake means effective when engaged to prevent rotation of said first mentioned sun gear, and third brake means effective when engaged to prevent rotation of said ring gear, said hydrodynamic torque converter being filled with fluid in neutral, first gear forward drive, third gear forward drive and reverse conditions of operation, said first brake means being engaged in first and second gear forward drive, said clutch being engaged in second, third and fourth gear forward drive, said second brake means being engaged in fourth forward drive, and said third brake means being engaged in reverse drive, all of said brakes and said clutch being released to establish neutral, a fluid pressure source adapted to be connected to said converter, means for admitting fluid under pressure from said source to said converter and for exhausting fluid from said converter including valve means for controlling the admission of fluid to and exhaust of fluid from said converter, and additional means for controlling the engagement and release of said clutch and said brakes for controlling the transmission drive ratio.

3. In a transmission of the type having a hydrodynamic torque converter unit adapted to be selectively filled with and emptied of working fluid, said torque converter unit having an engine driven impeller, a turbine and a reaction member, a planetary gearing unit for driving a power delivery shaft, said gearing unit including a planet carrier connected to said driven shaft for driving said driven shaft and supporting a short planet pinion gear in mesh with a long planet pinion gear, a first sun gear in mesh with said short planet pinion gear, means connecting said sun gear to said converter turbine for rotation therewith, means connecting said converter reaction member to said carrier for rotation therewith, a reaction sun gear in mesh with said long planet pinion, means for preventing rotation of said reaction sun gear in at least one direction including a first engageable and releasable brake, means for driving said ring gear including an engageable and releasable clutch effective when engaged to connect said ring gear to said impeller for rotation therewith, and means for preventing rotation of said ring gear including an engageable and releasable brake, said torque converter unit being filled with fluid in first and third gear forward drive and emptied of fluid in second gear forward drive, said first brake being engaged to complete the establishment of first gear forward drive, said first brake and said clutch being engaged to complete the establishment of second gear forward drive, said clutch being engaged to complete the establishment of third gear forward drive in conjunction with said torque converter, and said second brake being engaged to establish reverse drive in conjunction with said torque converters, a fluid pressure source adapted to supply fluid under pressure to said converter, means for controlling the admission of fluid pressure to and exhaust of fluid from said converter including a movable valve member, and additional means for controlling the engagement and release of said clutch and said brakes to control the transmission drive ratio.

4. In a transmission of the type having a hydrodynamic torque converter of the type adapted to be selectively filled with and emptied of working fluid and having a planetary gearing unit, an engine driven power input shaft, said torque converter having an impeller driven by said power input shaft, a turbine and a reaction member, a final power delivery shaft, said planetary gearing unit including a planet carrier connected to said converter reaction member and connected to said final power delivery shaft for rotation therewith as a unit, a short planet pinion and an intermeshing long planet pinion supported in said carrier, a first sun gear in mesh with said short planet pinion, means connecting said first sun gear to said turbine for rotation therewith as a unit, a second sun gear in mesh with said long planet pinion, selectively operable brake mean for braking said second sun gear against rotation in at least one direction, selectively operable clutch means for connecting said ring gear to said converter impeller for rotation therewith, second selectively operable brake means for braking said ring gear against rotation and third selectively operable brake means for braking said first-mentioned sun gear against rotation, said torque converter being filled with fluid in first gear and third gear forward drive and reverse drive and emptied of fluid in second gear and fourth gear forward drive, said first brake being engaged to complete the establishment of first gear forward drive, said clutch and said first brake being engaged to complete the establishment of second gear forward drive, said clutch being engaged to complete the establishment of third gear forward drive, said clutch and said third brake being engaged to complete the establishment of fourth gear forward drive, and said second brake being engaged to complete the establishment of reverse drive, a fluid pressure source adapted to deliver fluid under pressure to said converter, means for controlling the admission of pressure to and exhaust of pressure from said converter including a movable valve member, and additional means for controlling the engagement and release of said clutch and brakes to control the transmission drive ratio.

5. In a transmission of the type having a torque converter of the type adapted to be selectively filled with and emptied of working fluid and having a planetary gearing unit, an engine driven power input shaft, a torque converter impeller driven by said input shaft, a converted turbine and converter reaction member, a final power delivery shaft, means connecting said reaction member to said final power delivery shaft for rotation therewith including a planet carrier, a short planet pinion gear and a long planet pinion gear in mesh with said short planet pinion gear supported in said carrier, a first sun gear in mesh with said short planet pinion gear, means connecting said sun gear to said turbine for rotation therewith, a second sun gear in mesh with said long planet pinion gear, means for braking said second sun gear against rotation in at least one direction including a first brake, a ring gear in mesh with said long planet pinion gear, an engageable and releasable clutch effective when engaged to connect said ring gear to said impeller for rotation therewith, a second brake effective when engaged to brake said ring gear against rotation, and a third brake effective when engaged to prevent rotation of said first-mentioned sun gear, said torque converter being filled with fluid in first, third and reverse drive conditions of operation, said first brake being engaged to prevent rotation of said second sun gear in both first and second gear drives said clutch being engaged in conjunction with said first brake to establish second gear drive, said clutch being engaged to establish third gear drive in conjunction with said converter, said clutch and said third brake being engaged to establish fourth gear drive, and said second brake being engaged to establish reverse drive in conjunction with said converter, a fluid pressure source adapted to deliver fluid under pressure to said converter, said clutch and said brakes, means for controlling the admission of fluid to an exhaust of fluid from said converter including a movable valve member, and additional valve means for controlling the admission of fluid to an exhaust of pressure from said clutch and said brakes.

6. In a transmission adapted to provide four forward drive ratios and reverse, a torque converter of the type adapted to be selectively filled with and emptied of working fluid, said converter comprising an impeller, a turbine and a reaction member, a power input shaft connected to said impeller for driving said impeller, a planetary gearing unit, a final power delivery shaft, said gearing unit including a planet carrier connecting said converter reaction member to said final power delivery shaft for rotation therewith as a unit, intermeshing short and long planet pinion gears supported by said carrier, a first sun gear in mesh with said short planet pinion gear, means connecting said turbine to said sun gear for rotation therewith, a second sun gear in mesh with said long planet pinion, means for preventing rotation of said second sun gear in at least one direction including a first engageable and releasable brake, a ring gear in mesh with said long planet pinion, an engageable and releasable clutch effective when engaged to connect said ring gear to said impeller for rotation therewith, a second brake effective when engaged to prevent rotation of said ring gear, and a third brake effective when engaged to prevent rotation of said first sun gear, said torque converter being filled with working fluid in first, direct and reverse drive ratio and emptied of fluid in second and overdrive drive ratios, said first brake being engaged to complete the establishment of first gear drive ratio, said clutch and said first brake being engaged to establish second gear drive ratio, said clutch being engaged to establish direct drive in conjunction with torque converter, said clutch and said third brake being engaged to establish overdrive drive ratio, and said second brake being engaged to complete the establishing of reverse drive in conjunction with said converter, a source of fluid under pressure adapted to be connected to said converter, said clutch and said brakes, means for controlling the admission of fluid to and exhaust of fluid from said converter including first valve, means including additional valve means for controlling the admission of fluid to an exhaust of fluid from said clutch and said brakes, respectively, to control the transmission drive ratio.

References Cited by the Examiner
UNITED STATES PATENTS

| | | | |
|---|---|---|---|
| 3,021,727 | 2/1962 | Kelley et al. | 74—677 |
| 3,024,668 | 3/1962 | Kronogard et al. | 74—688 |
| 3,110,198 | 11/1963 | Borman et al. | 74—688 |
| 3,209,617 | 10/1965 | Kalversburg | 74—688 |

DAVID J. WILLIAMOWSKY, *Primary Examiner.*

J. R. BENEFIEL, *Assistant Examiner.*